Nov. 5, 1940.  T. SHIMIZU ET AL  2,220,551
APPARATUS FOR STARTING AN ELECTRIC SPARK
Filed Nov. 21, 1938
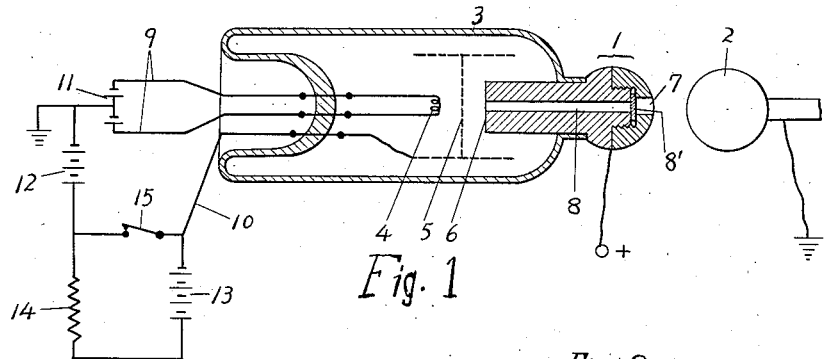
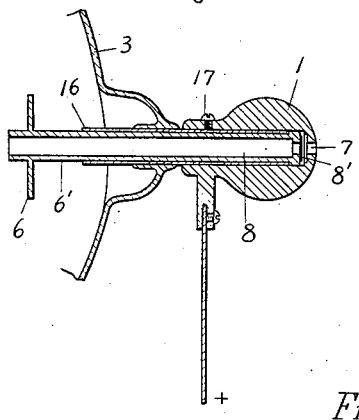
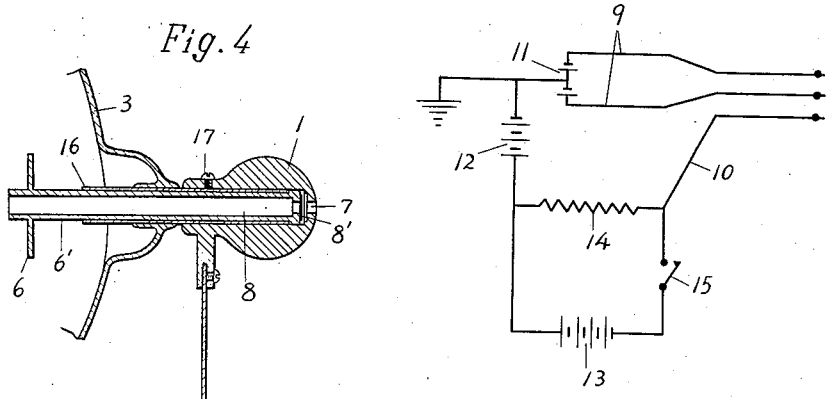
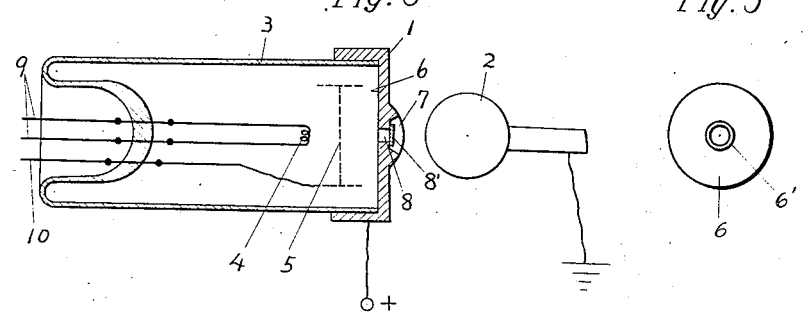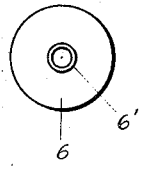
Inventor:
T. Shimizu + M. Hirata
By: Glascock Downing + Seebold
Attorneys.

Patented Nov. 5, 1940

2,220,551

UNITED STATES PATENT OFFICE 2,220,551

APPARATUS FOR STARTING AN ELECTRIC SPARK

Takeo Shimizu and Moriso Hirata, Tokyo, Japan, assignors to Zaidan Hojin Rikagaku Kenkyujo, Tokyo, Japan Application November 21, 1938, Serial No. 241,690

3 Claims. (Cl. 176—1)

This invention relates to apparatus for starting an electric spark and comprises a triode, a positive spark-electrode connected to a plate of the triode, an electronic ray passage extending from the plate to the positive spark-electrode, a thin metallic window closing the passage, an opening provided in the positive spark-electrode outside the metallic window and in continuation to the passage, and a negative spark-electrode arranged opposite the opening of the positive spark-electrode. The object of the invention is to provide apparatus for starting an electric spark which is very sensitive and steady in the operation of starting the spark.

In the accompanying drawing,

Fig. 1 is a diagrammatical view of one example of the apparatus according to the invention.

Fig. 2 is a modification of the electric circuit for controlling the grid voltage of the triode employed in this invention.

Fig. 3 is a modification of the triode by which the positive spark-electrode and the plate side thereof are contracted together.

Fig. 4 is a sectional view of a preferable detailed construction showing the attachment of the triode and the positive spark-electrode.

Fig. 5 is an end view of the plate shown in Fig. 4.

In Fig. 1, 1 is a positive spark-electrode, 2 a negative spark-electrode arranged opposite an opening 7 provided on the electrode 1. 3 is a triode having a filament 4, a grid 5 and a plate 6. The positive spark-electrode 1 is made in one piece with the plate 6 and sealed in the wall of the triode 3. The plate has a central passage 8 for electronic rays extending from the plate 6 to the opening 7 of the electrode 1 and the passage is closed by a thin metallic window 8' to keep the vacuum in the triode. This window 8' may be for instance made of nickel or aluminium so that the electronic rays or X-rays generated thereby are penetrable therethrough. 9 is a circuit for the filament 4 having a source of electricity or cell 11. 10 is a circuit wire for the grid 5 connected to a source of electricity or battery 12 through a switch 15. An accelerating source of electricity or battery 13 of slightly higher voltage than the battery 12 is associated with the circuit 10 and a high resistance 14 is interposed between the batteries 12 and 13, and the switch 15 is arranged for short-circuiting the part composed of 13 and 14. The parts 10, 12, 13, 14 and 15 constitute means of controlling the grid voltage of the triode.

In operation, the electrode 2 and the cell 11 are grounded so that their voltage is made zero. In this state, when the key 15 is closed, the grid voltage is made negative due to the voltage of the battery 12 and thereby no electrons can flow from the filament 4. Then the electrode 1 is charged to a suitably high positive voltage, which, in the ordinary state, is not high enough to generate electric sparks between the electrodes 1 and 2. When the electrode 1 is highly charged, a great difference of voltages occurs between the plate 6 and the filament 4. However, in this state the voltage of the grid 5 is still negative so that no electrons can flow from the filament 4 to the plate 6. Then the key 15 is opened to affect the grid 5 by the positive voltage of the accelerating battery 13 and thereby electrons flow instantly from the filament 4 to the plate 6. The speed of the flow of electrons thus generated is accelerated by the plate 6 under high charge, the flow forming high speed electronic rays, which pass through the passage 8, penetrate the thin metallic window 8', go out of the opening 7 of the electrode 1 and ionize air lying between the two electrodes 1 and 2. When the thickness of the metallic window is over a certain extent, the cathode rays may not penetrate therethrough. In this case X-rays generated by the electronic rays in the neighbourhood of the metallic window 8', pass through the metallic window and ionize air outside the opening 7. It is well known that when air is powerfully ionized, the voltage difference necessary to generate electric sparks is greatly decreased. Therefore by the ionization of air as above described, an electric spark is generated between the electrodes 1 and 2. The time of duration of the spark varies according to the kind of the source of the voltage charging the plate 6 and the electrode 1. When a condenser is employed as the source, the spark instantly diminishes. The metallic window 8' is preferably spaced from the outer surface of the electrode 1 so that damaging effects of the spark upon the metallic window 8' can be avoided.

Fig. 2 shows another circuit for controlling the grid voltage of the triode. In this example, when the key 15 is opened, the grid voltage is kept negative and when it is closed, the spark is started. The same numerals show corresponding parts shown in Fig. 1.

The actual closing and opening of the key 15 may be replaced by breaking or connecting the circuit wire by means of a moving body of high velocity, or the grid voltage may be controlled indirectly by any electrical or optical stimulations. Therefore the apparatus can be conveniently employed in the measurement of the velocity of gun projectiles or very short intervals of time, or in high speed photograph-taking etc. The apparatus is excellent in that the time required from the closing or opening of the key to the start of spark is extraordinarily short and that the starting of the spark is very steady, so that great advantages are obtained in the practical applications of the apparatus such as above stated.

Fig. 3 shows a modification of the triode and the positive spark-electrode. In this example, the electrode 1 and the plate 6 are made to take the form of a metallic wall of the triode, and the outer central part of the wall is somewhat outwardly curved to give a convenient form for the generation of sparks. Same numerals show corresponding parts to those in Fig. 1.

The preferable embodiment of attachment of the spark-electrode 1 to the triode 3 is shown in Figs. 4 and 5, although this is not an essential part of the invention. In this example, the plate 6 has a central tubular extension 6', which is sealed in a copper tube 16, which is sealed with respect to the glass walls 3 of the triode. The end of the passage 8 is closed by a thin metallic window 8' which is welded to the end of the tubular extension 6'. The electrode 1 having an opening 7 is cupped upon the copper tube 16 and is clamped by means of a stud bolt 17.

In the examples shown, the electronic ray passages extend continuously from the plate to the positive spark-electrode. However this is not essential and a part of the passage may be replaced by a mere vacuum space within the triode, and the plate and the spark-electrode connected to independent sources of potential.

What we claim is:

1. In apparatus for starting an electric discharge, an evacuated tube having a filament and a grid and a plate therein, said plate having a passage therein which terminates in an electrode outside the tube, another electrode arranged outside the tube in a spaced relation with respect to said electrode, and a relatively thin metal window closing said passage and spaced from the outer end of the first mentioned electrode.

2. In apparatus for starting an electric discharge, an evacuated tube having a filament and a grid and a plate therein, said plate having a passage therein which terminates in an electrode outside the tube, another electrode arranged outside the tube in a spaced relation with respect to said electrode, a relatively thin metal window closing the passage of the first mentioned electrode, an electrical source for negatively biasing said grid so that the electrodes may be charged at a relatively high voltage without creating a discharge therebetween, another electrical source for biasing said grid positively whereby electrons may pass to the plate and penetrate the metal window for ionizing air between the electrodes to start a discharge therebetween.

3. Apparatus for starting an electric spark comprising, a discharge tube having a plate therein, a positive electrode of a convex form connected to the plate side of the tube and having an electronic ray passage extending from the plate thereof to and through the positive electrode and opening at the top of the convex surface thereof, a relatively thin metallic window permitting the passage of the electron rays but mechanically closing the passage at a position slightly backward from the extreme end of the passage so as to provide an opening outside the metallic window, and a negative electrode arranged opposite the opening.

TAKEO SHIMIZU.
MORISO HIRATA.